US 12,496,096 B2

United States Patent
Hagan, Jr.

(10) Patent No.: US 12,496,096 B2
(45) Date of Patent: Dec. 16, 2025

(54) ESOPHAGEAL FOOD BOLUS DISLODGER DEVICE AND METHOD OF USING SAME

(71) Applicant: Paul Hagan, Jr., Holly Springs, NC (US)

(72) Inventor: Paul Hagan, Jr., Holly Springs, NC (US)

( * ) Notice: Subject to any disclaimer, the term of this patent is extended or adjusted under 35 U.S.C. 154(b) by 1025 days.

(21) Appl. No.: 17/094,020

(22) Filed: Nov. 10, 2020

(65) Prior Publication Data

US 2021/0052303 A1    Feb. 25, 2021

Related U.S. Application Data

(63) Continuation-in-part of application No. 16/282,269, filed on Feb. 21, 2019, now abandoned.

(51) Int. Cl.
*A61B 17/50* (2006.01)
*A61B 17/00* (2006.01)

(52) U.S. Cl.
CPC .... *A61B 17/50* (2013.01); *A61B 2017/00296* (2013.01); *A61B 2017/00557* (2013.01); *A61B 2017/00818* (2013.01); *A61B 2017/00862* (2013.01)

(58) Field of Classification Search
CPC ............. A61B 17/50; A61B 17/24; A61B 2018/00488; A61B 17/22031; A61B 17/22032; A61B 2017/22034; A61B 2017/22035; A61D 1/12; A61M 2025/109; A61M 25/10; A61M 29/02
See application file for complete search history.

(56) References Cited

U.S. PATENT DOCUMENTS

| | | | |
|---|---|---|---|
| 2,693,191 A | * | 11/1954 | Raiche ............... A61M 25/1011 604/101.05 |
| 3,827,437 A | | 8/1974 | Inaba |
| 4,203,429 A | | 5/1980 | Vasilevsky et al. |
| 4,295,464 A | | 10/1981 | Shihata |
| 4,519,403 A | | 5/1985 | Dickhudt |
| 5,108,416 A | * | 4/1992 | Ryan ....................... A61F 2/958 604/103.05 |
| 5,316,024 A | * | 5/1994 | Hirschi ............. A61M 25/0127 607/116 |
| D360,260 S | | 7/1995 | Brandt |

(Continued)

FOREIGN PATENT DOCUMENTS

WO    WO2011156697 A1    12/2011

*Primary Examiner* — Darwin P Erezo
*Assistant Examiner* — Zehra Jaffri
(74) *Attorney, Agent, or Firm* — Casimir Jones, SC; Jeffrey W. Childers

(57) ABSTRACT

An esophageal food bolus dislodger (EFBD) device and method of using same is disclosed. For example, an EFBD device is provided that may include an esophageal catheter that has a distal guidance member, and also including a cone member, an inflation member, and a boring member arranged along the esophageal catheter in advance of the distal guidance member. In EFBD device, the combination of the inflation member in a partially or fully deployed state, the cone member in a partially or fully deployed state, and the boring member may be used to dislodge food in a procedure for endoscopic removal of food bolus. Further, a method of using the presently disclosed EFBD device for dislodging food from the esophagus is provided.

8 Claims, 10 Drawing Sheets

(56) References Cited

U.S. PATENT DOCUMENTS

| | | | |
|---|---|---|---|
| 8,529,581 B2 | 9/2013 | Massicotte et al. | |
| 9,937,329 B2 | 4/2018 | Niazi | |
| 2017/0239447 A1* | 8/2017 | Yang | A61B 17/12168 |
| 2018/0214289 A1* | 8/2018 | Yang | A61M 25/10 |
| 2018/0344993 A1* | 12/2018 | Ganz | A61M 25/1011 |

* cited by examiner

ESOPHAGEAL FOOD BOLUS DISLODGER DEVICE AND METHOD OF USING SAME

CROSS-REFERENCE TO RELATED APPLICATION

This application is a continuation-in-part of U.S. patent application Ser. No. 16/282,269, entitled "Esophageal Food Disimpactor," filed on Feb. 21, 2019, which is incorporated by reference herein in its entirety.

TECHNICAL FIELD

The presently disclosed subject matter relates generally to esophageal catheters and more particularly to an esophageal food bolus dislodger (EFBD) device and method of using same.

BACKGROUND

Food bolus obstruction (FBO) is a common presentation to the emergency department and is usually managed by gastroenterologists. FBO is defined as esophageal obstruction due to unintentional ingestion of food products. The majority of FBO occurs in the elderly population and men are more commonly affected than women.

Endoscopic removal of food bolus still remains the procedure of choice with a high success rate and minimal complications. Patients with food bolus impaction that cannot manage their own secretion (i.e., complete obstruction) should have endoscopy performed urgently. A variety of endoscopic retrieval devices are currently available, including net retrievers, polypectomy snares, dormia baskets, grasping forceps, and tripod graspers. The choice of endoscopic device(s) depends, for example, on device availability, type and size of food bolus, location of FBO within the esophagus, and the preference of the endoscopist performing the procedure. Endoscopic methods of food bolus removal involve either the extraction (pull) maneuver or the advancement (push) maneuver. Most soft non-impacted FB can be pushed by gentle pressure or by air insufflation. For patients who failed the push maneuver or have bony food impaction with sharp edges, the pull maneuver is recommended.

Endoscopic removal of food bolus can be challenging, due to a limited working space within the esophagus and a restricted endoscopic view of the food bolus. For example, conventional endoscopic devices tend to remove food bolus after fragmentation in a piecemeal fashion and may result in an incomplete removal of food bolus. Additionally, the challenges associated with endoscopic removal of food bolus may result in procedures that excessively long. Therefore, new approaches are needed with respect to endoscopic removal of food bolus.

SUMMARY

In some aspects, the presently disclosed subject matter provides an esophageal food bolus dislodge device comprising: an esophageal catheter comprising a proximal end and a distal guidance member; an inflation member comprising a proximal end and a distal end; a cone member positioned at the proximal end of the inflation member; and a boring member positioned at the distal end of the inflation member, wherein the cone member, the inflation member, and the boring member are arranged along the esophageal catheter in advance of the distal guidance member, and wherein the proximal end of inflation member and cone member are secured to the esophageal catheter at a proximal anchor region and the distal end of inflation member and boring member are secured to the esophageal catheter at a distal anchor region.

In some aspects, the esophageal catheter, inflation member, and distal guidance member together comprise an esophageal balloon catheter. In some aspects, the inflation member comprises an esophageal balloon. In some aspects, the inflation member comprises an elastomer material.

In some aspects, the cone member has a structure selected from the group consisting of a cone-like structure, a plunger-like structure, and an umbrella-like structure. In some aspects, the cone member comprises a flexible elastomer material.

In some aspects, the inflation member and the cone member each has a non-deployed or uninflated state and a deployed or inflated state. In some aspects, the cone member in the deployed state has a diameter greater than a diameter of the inflation member in the deployed state.

In some aspects, the boring member comprises a hollow tapered structure having a blunt distal end adapted to be mated to the distal end of inflation member and overlapping an upper portion of distal guidance member. In some aspects, the boring member comprises a structure selected from the group consisting of a coil-like structure and an arrangement of spring-force fingers. In some aspects, the boring member comprises surgical plastic or silicone. In some aspects, the coil-like structure or the arrangement of spring-force fingers is imbedded in the surgical plastic or silicone material comprising the boring member.

In some aspects, the distal guidance member comprises silicone rubber.

In some aspects, the proximal end of the esophageal catheter is coupled to an endoscope.

In other aspects, the presently disclosed subject matter provides a method for dislodging one or more food articles from an esophagus of a subject in need thereof, the method comprising:
  (a) providing a presently disclosed esophageal food bolus dislodge device;
  (b) introducing the esophageal food bolus dislodge device in a non-deployed or uninflated state into the esophagus of the subject until the device is engaged with the one or more food articles to be dislodged;
  (c) deploying or inflating the inflation member, thereby deploying the cone member;
  (d) advancing the esophageal food bolus dislodge device further into the esophagus until the one or more food articles are dislodged; and
  (e) deflating the inflation member such that the inflation member and the cone member are in a non-deployed or uninflated state; and
  (f) withdrawing the esophageal food bolus dislodge device from the esophagus.

In some aspects, the method further comprises moving the esophageal food bolus dislodge device in a back and forth motion to dislodge the one or more food articles.

In some aspects, the method further comprises coupling the proximal end of the esophageal catheter of the esophageal food bolus dislodge device to an endoscope.

BRIEF DESCRIPTION OF THE DRAWINGS

Figure 1:
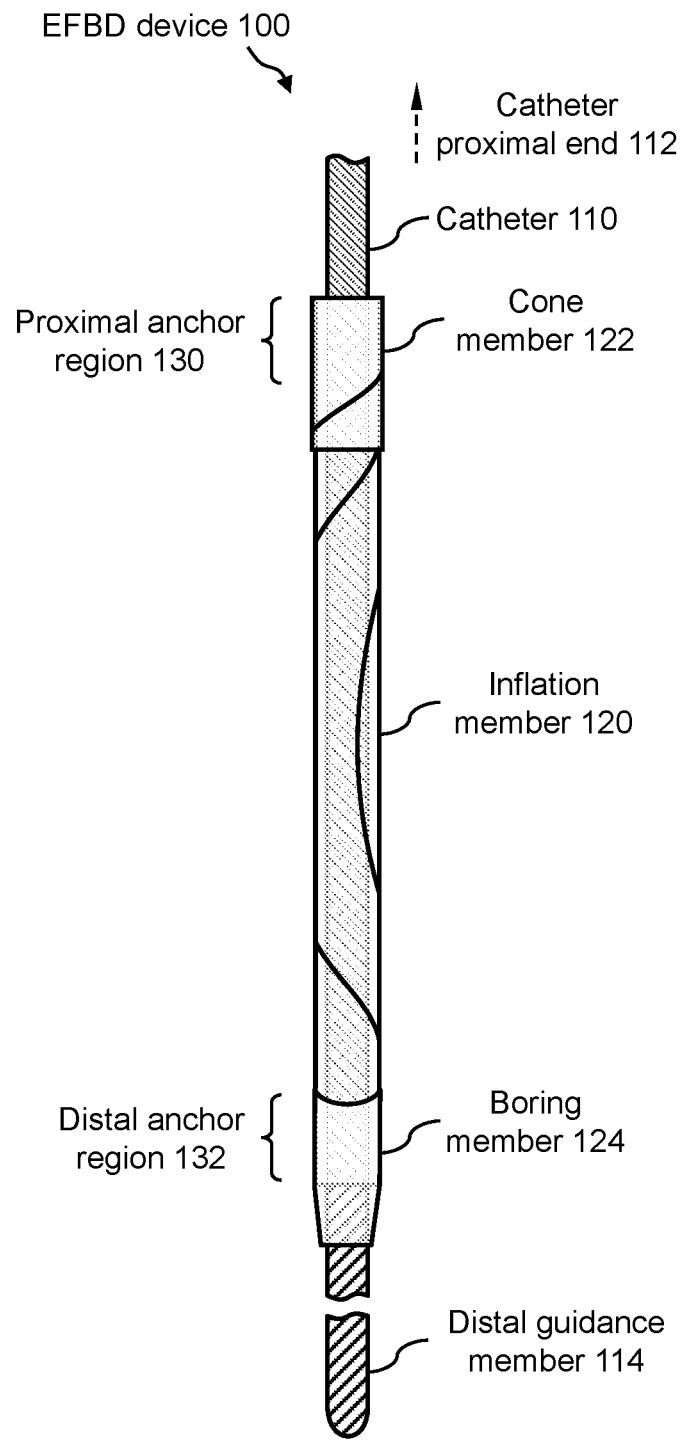
Figure 2:
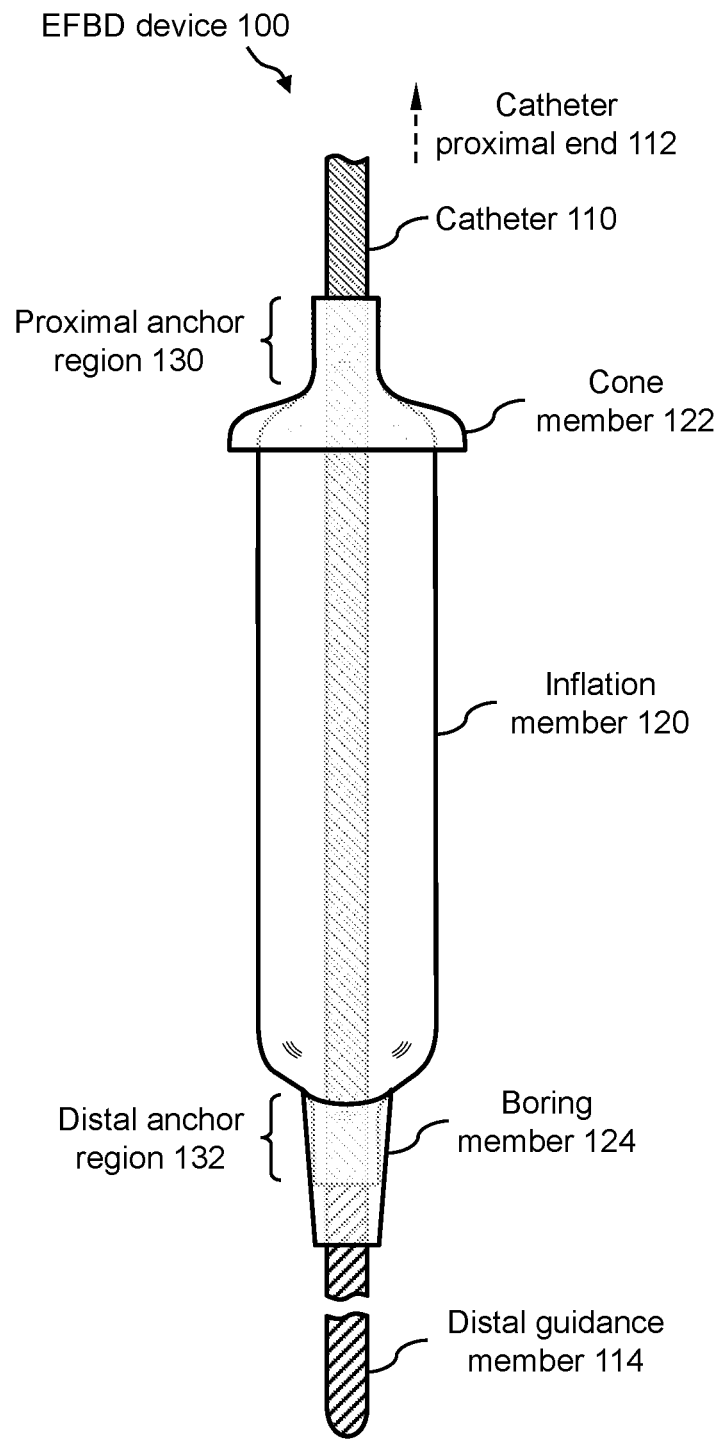
Figure 3:
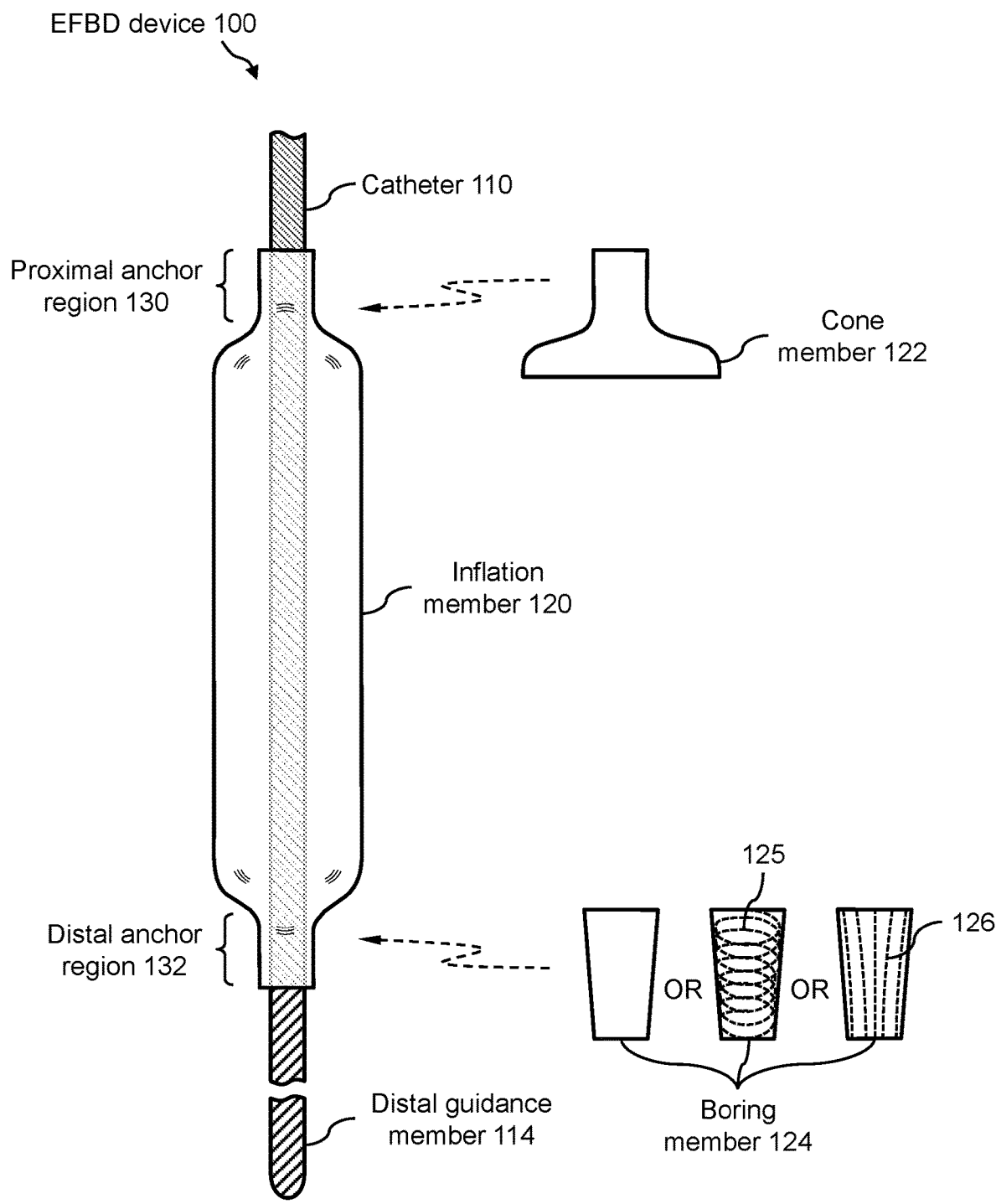
Figure 4A:
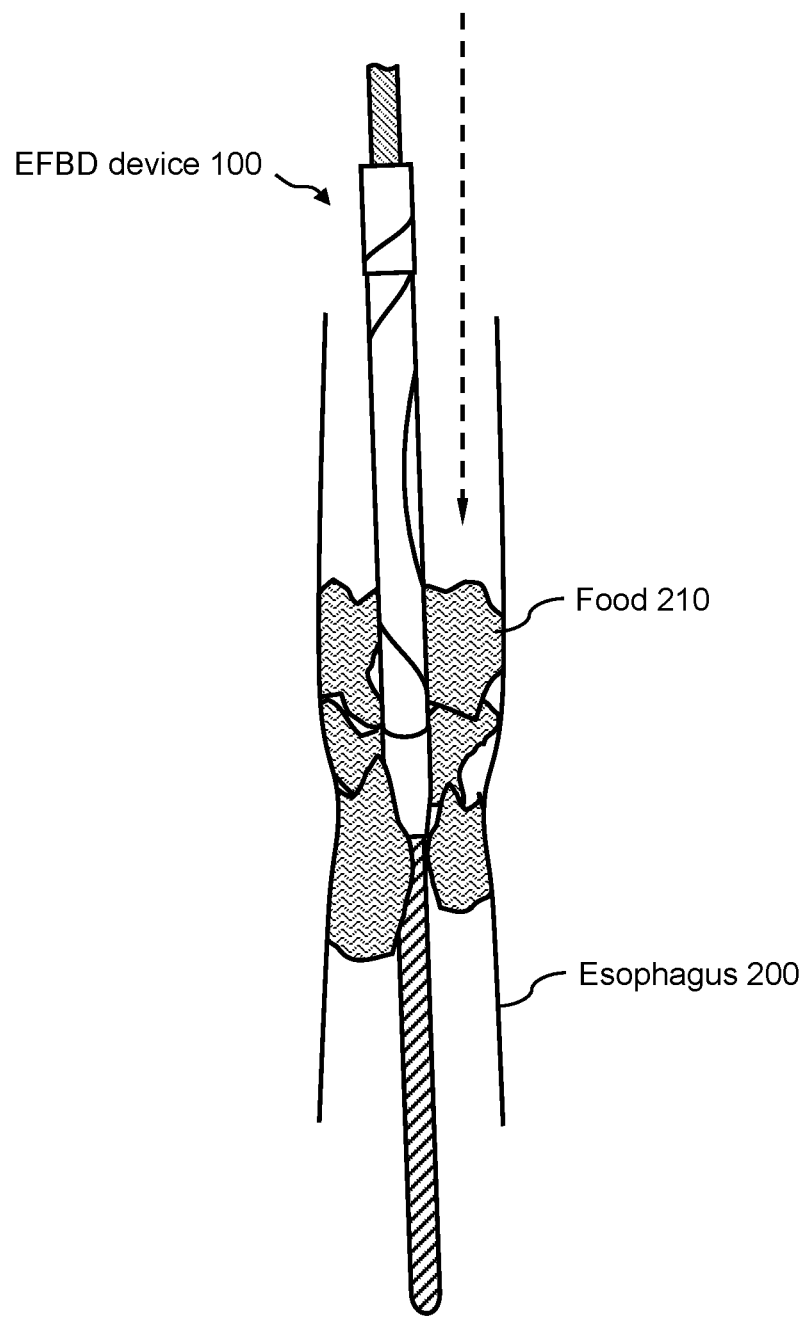
Figure 4B:
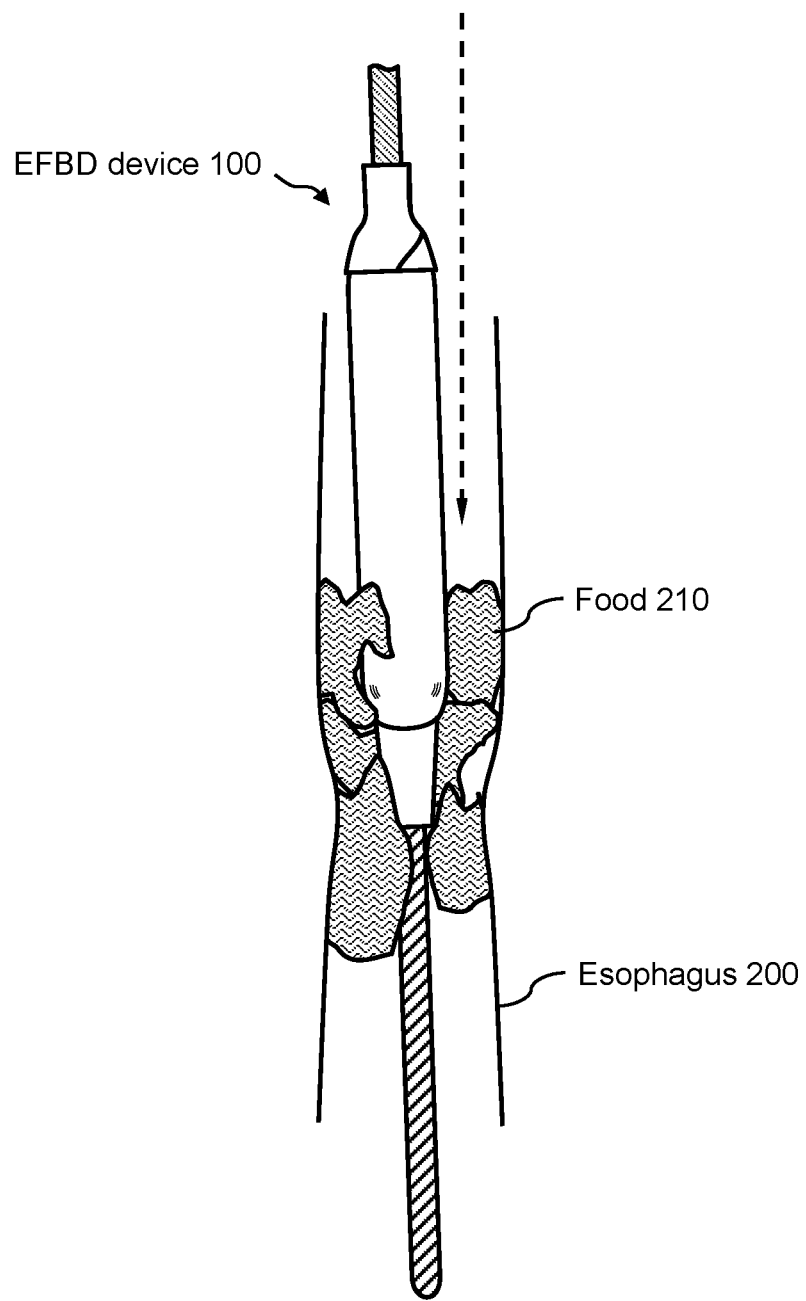
Figure 4C:
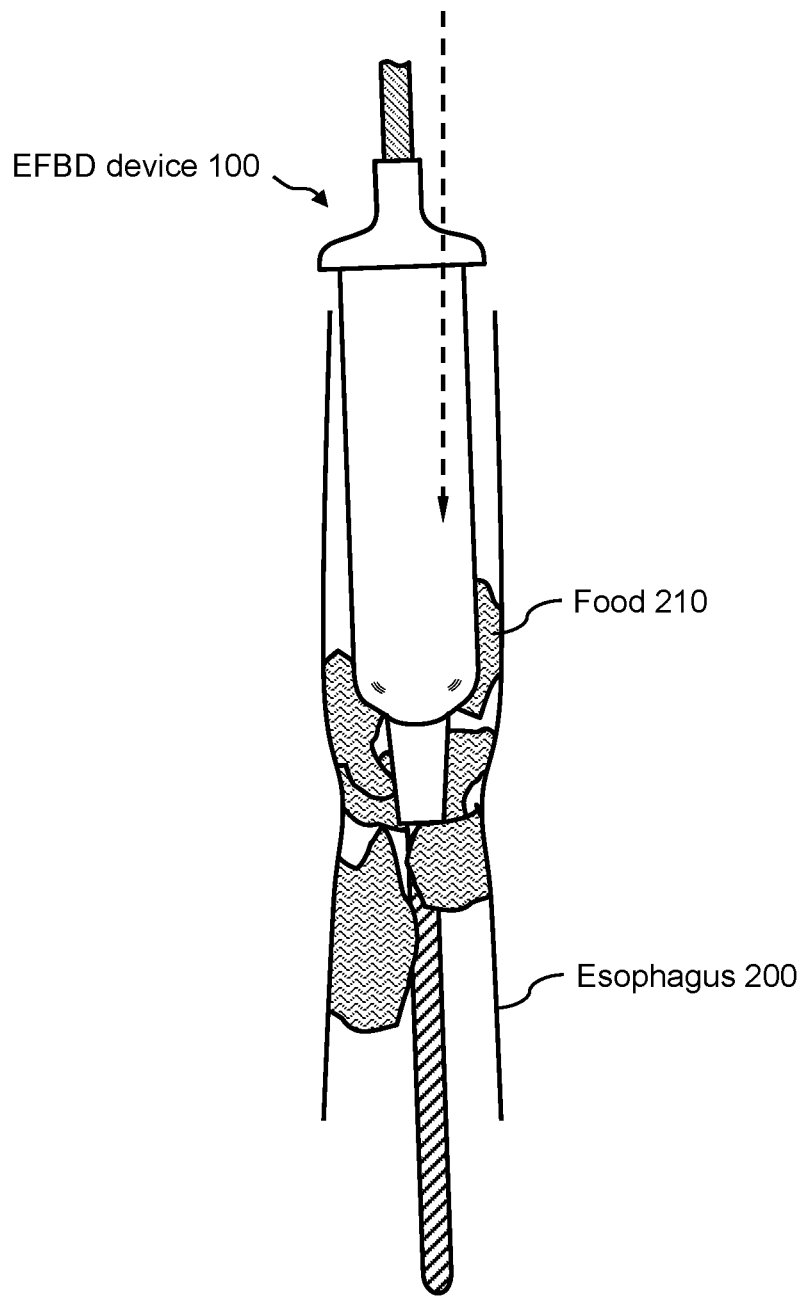
Figure 4D:
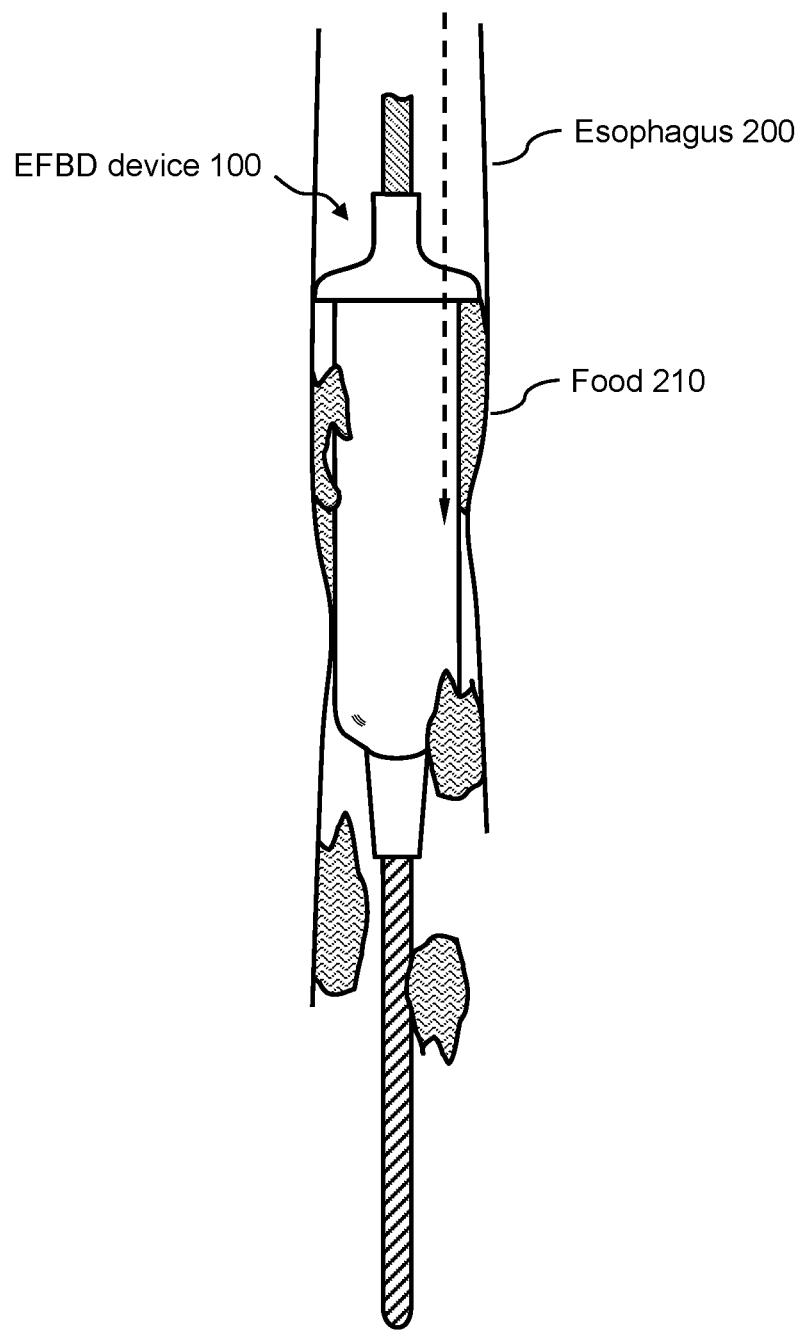
Figure 4E:
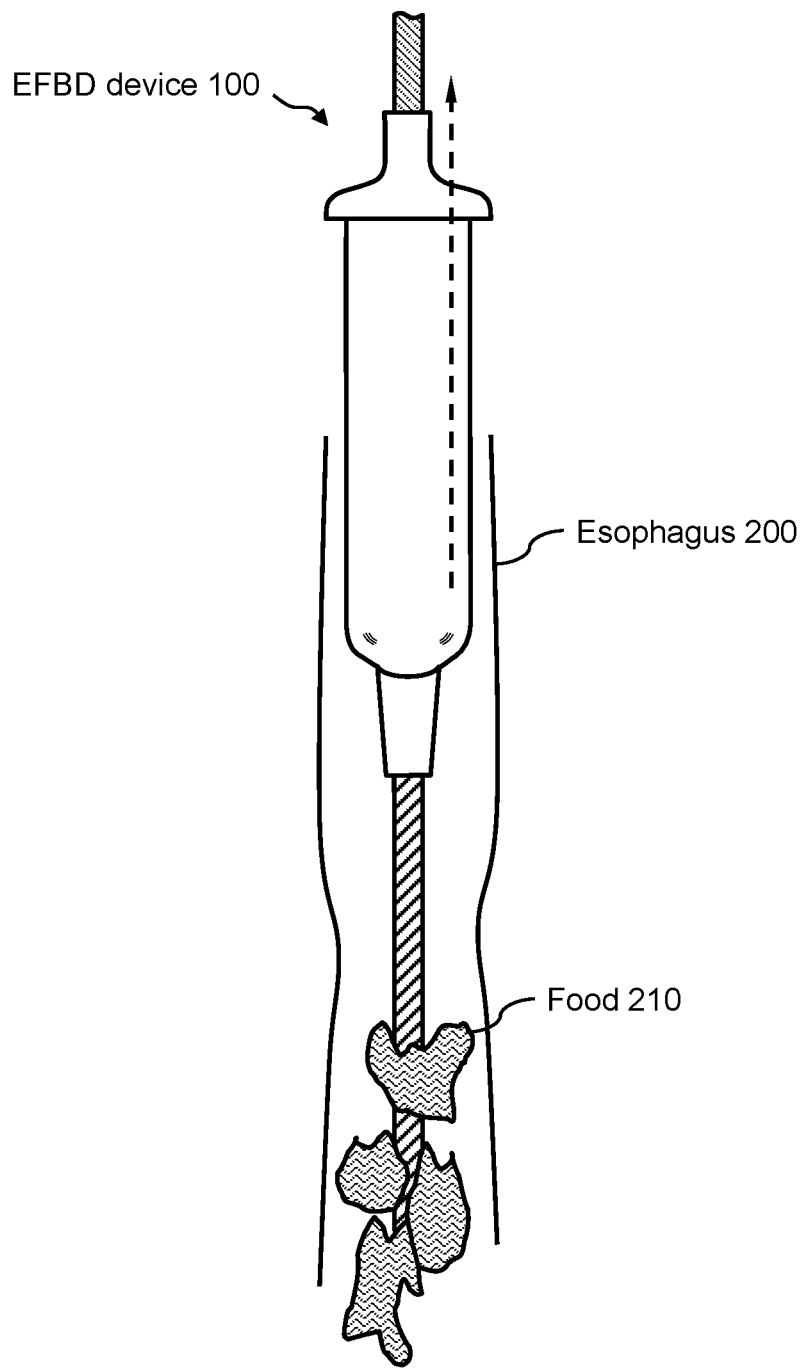
Figure 4F:
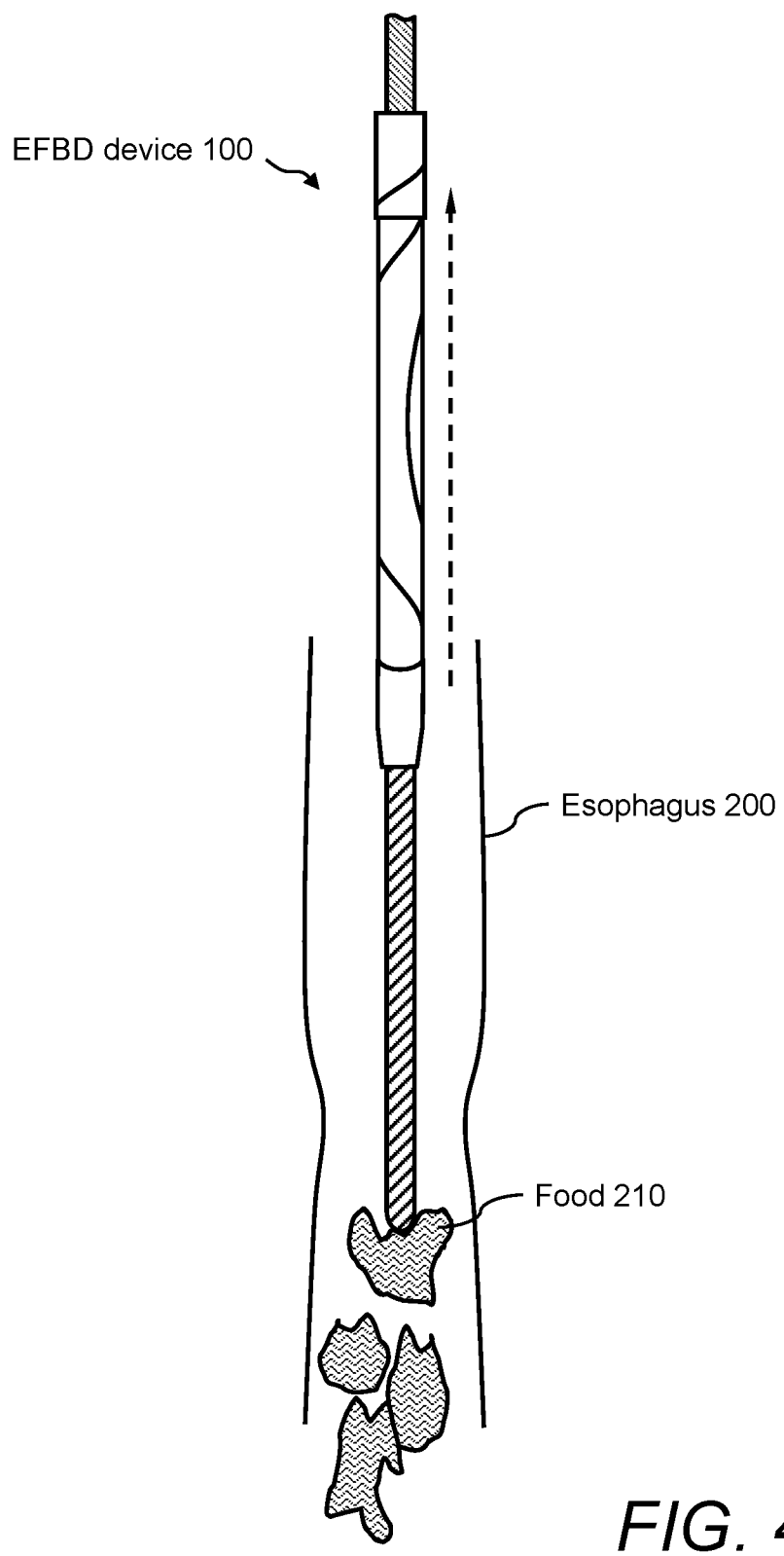
Figure 5:
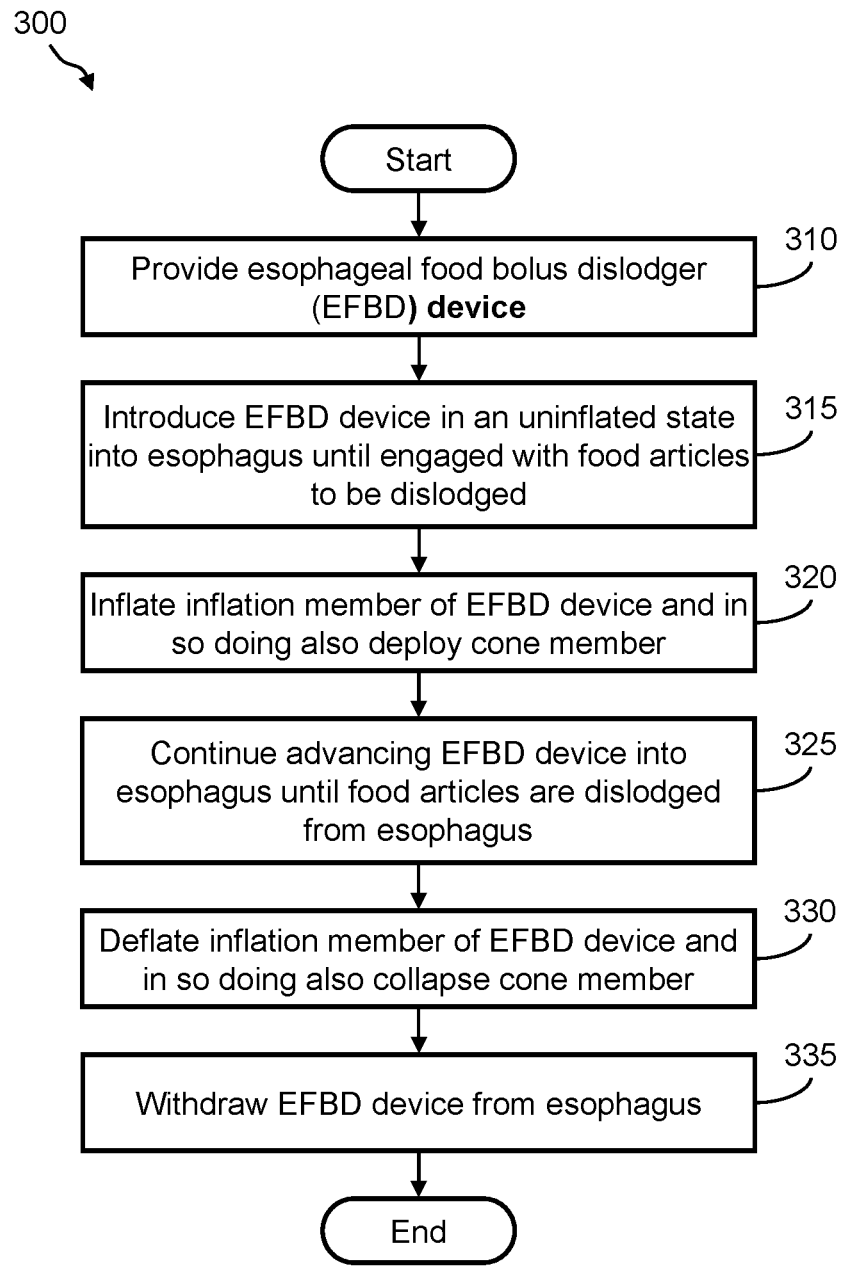

Having thus described the presently disclosed subject matter in general terms, reference will now be made to the accompanying drawings, which are not necessarily drawn to scale, and wherein:

FIG. 1 illustrates a side view of an example of the presently disclosed EFBD device for dislodging food from the esophagus in the non-deployed or deflated state;

FIG. 2 illustrates a side view of an example of the presently disclosed EFBD device for dislodging food from the esophagus in the deployed or inflated state;

FIG. 3 illustrates an exploded view of an example of the presently disclosed EFBD device;

FIG. 4A, FIG. 4B, FIG. 4C, FIG. 4D, FIG. 4E, and FIG. 4F show an example of a process of using the presently disclosed EFBD device for dislodging food from the esophagus; and FIG. 5 illustrates a flow diagram of an example of a method of using the presently disclosed EFBD device for dislodging food from the esophagus.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides an esophageal food bolus dislodger (EFBD) device and method of using the same. For example, the presently disclosed EFBD device may be used for the endoscopic removal of food bolus.

In some embodiments, the presently disclosed EFBD device may include an esophageal catheter that has a distal guidance member, and also including a cone member, an inflation member, and a boring member arranged along the esophageal catheter in advance of the distal guidance member.

In some embodiments, the presently disclosed EFBD device provides a cone member, an inflation member, and a boring member arranged along the esophageal catheter and wherein the cone member is arranged at the proximal end of the inflation member and the boring member is arranged at the distal end of the inflation member.

In some embodiments, the presently disclosed EFBD device provides an inflation member that when deployed or inflated causes the cone member to deploy or open (i.e., open umbrella style) and wherein the diameter of the deployed cone member is greater than the diameter of the deployed inflation member.

In some embodiments, the presently disclosed EFBD device provides a boring member that has a blunt distal end suitable for pushing against food articles that may be lodged in the esophagus in advance of the inflation member.

In some embodiments, the presently disclosed EFBD device provides a cone member that when deployed or open (i.e., open umbrella style) may be suitable for engaging in a sweeping action with the esophageal walls and pushing against food articles that may be lodged in the esophagus following the inflation member.

In some embodiments, the presently disclosed EFBD device provides a cone member, an inflation member, and a boring member arranged along the esophageal catheter and wherein the combination of the cone member in the partially or fully deployed state, the inflation member in the partially or fully deployed state, and the boring member may be used to dislodge food in a procedure for endoscopic removal of food bolus.

Further, a method of using the presently disclosed EFBD device for dislodging food from the esophagus is provided.

Referring now to FIG. 1, FIG. 2, and FIG. 3 are various views of an example of the presently disclosed EFBD device 100 for dislodging food from the esophagus. For example, FIG. 1 is a side view of EFBD device 100 in the non-deployed or deflated state, FIG. 2 is a side view of EFBD device 100 in the deployed or inflated state, and FIG. 3 is an exploded view of EFBD device 100.

The presently disclosed EFBD device 100 may be useful for various actions such as to remove the impaction of food in the esophagus and thereby open the esophagus. For example, EFBD device 100 may be used in some cases where the usual accessories, such as forceps, snares, tripods, nets and the like, are ineffective. Further, using EFBD device 100, an esophageal dilatation may be performed as necessary to pass the endoscope without the often risky, pounding and tedium required when conventionally using the blunt end of the endoscope. For example, using EFBD device 100, food bolus may be safely compressed, minimizing its bulk while gently guiding/pushing the food bolus safely from the esophagus into the stomach.

EFBD device 100 may include, for example, an esophageal catheter 110 that has a proximal end 112 and a distal guidance member 114. Proximal end 112 of esophageal catheter 110 may be coupled to an endoscope (not shown). Thus, EFBD device 100 may be passed thru or via the endoscope. Further, EFBD device 100 may include an inflation member 120, a cone member 122 at the proximal end of inflation member 120, and a boring member 124 at the distal end of inflation member 120; all arranged along esophageal catheter 110 in advance of distal guidance member 114. Accordingly, EFBD device 100 is configured with esophageal catheter 110 arranged inside inflation member 120, cone member 122, and boring member 124.

The proximal end of inflation member 120 and cone member 122 are secured to esophageal catheter 110 at proximal anchor region 130. The distal end of inflation member 120 and boring member 124 are secured to esophageal catheter 110 at distal anchor region 132. In one example, the ends of inflation member 120, cone member 122, and boring member 124 may be secured to esophageal catheter 110 via an adhesive.

Esophageal catheter 110 may be, for example, a standard esophageal catheter that may be from about 2.2 mm to about 2.6 mm in diameter and about 300 cm long. Together, esophageal catheter 110, inflation member 120, and distal guidance member 114 may be a standard esophageal balloon catheter. For example, inflation member 120 may be a standard esophageal balloon with an inflation diameter of, for example, from about 10 mm to about 20 mm. Inflation member 120 may be formed of, for example, an elastomer material and may be, for example, about 4-8 cm long. Distal guidance member 114 is an elongated guidance portion of EFBD device 100. Distal guidance member 114 may have a smooth rounded tip for easy advancing and may be formed of, for example, silicone rubber. Distal guidance member 114 may be, for example, about 5 cm long. Currently, the standard tip of standard dilatation balloon/inflation members is short, stiff, and seems sharp. By contrast, the tip of distal guidance member 114 of EFBD device 100 is longer and softer than standard tips, being solely for guidance. Accordingly, as compared with standard tips, distal guidance member 114 may be less likely to perforate or penetrate the esophageal wall.

Cone member 122 is a cone-like, plunger-like, or umbrella-like structure that sits atop the proximal end of inflation member 120. Cone member 122 may be formed of, for example, a flexible elastomer material. When inflation member 120 is not inflated, cone member 122 sits in a non-deployed or relaxed state, as shown in FIG. 1. By contrast, when inflation member 120 is inflated, cone member 122 expands (is deployed) in umbrella-like fashion, as shown in FIG. 2. That is, the inflation of inflation member 120 causes cone member 122 to deploy or open in umbrella-like fashion. Inflation member 120 may be inflated, for example, with a predetermined volume of sterile solution (e.g., sterile water). Further, the deployed diameter of cone member 122 is greater than the deployed diameter of inflation member 120. For example, the deployed diameter of cone member 122 may be about 4 mm greater than the deployed diameter of inflation member 120. In one example, when the deployed diameter of inflation member 120 is about 15 mm, then the deployed diameter of cone member 122 may be about 19 mm.

Boring member 124 may be a hollow tapered structure that has a blunt distal end that is designed to be mated to the distal end of inflation member 120 and then overlapping the upper portion of distal guidance member 114. Boring member 124 may be formed of, for example, surgical plastic or silicone. Boring member 124 provides a structure in advance of inflation member 120 that may be suitable for pushing against or boring through food articles that may be lodged in the esophagus and assist to dislodge them.

In another example, boring member 124 may include a coil-like structure 125, as shown in FIG. 3. For example, the coil-like structure 125 may be imbedded in the surgical plastic or silicone material that forms boring member 124. This boring member 124 with the embedded coil-like structure 125 allows the upper portion thereof to expand as inflation member 120 inflates and then retract by spring force as inflation member 120 deflates.

In yet another example, boring member 124 may include an arrangement of spring-force fingers 126, as shown in FIG. 3. For example, the spring-force fingers 126 may be imbedded in the surgical plastic or silicone material that forms boring member 124. This boring member 124 with the embedded spring-force fingers 126 allows the upper portion thereof to expand as inflation member 120 inflates and then retract by spring force as inflation member 120 deflates.

In EFBD device 100, the combination of inflation member 120 in the partially or fully deployed state, cone member 122 in the partially or fully deployed state, and boring member 124 may be used to dislodge food in a procedure for endoscopic removal of food bolus. Generally, EFBD device 100 may be bendable such that it may be easily maneuvered into and around the esophagus, yet still stiff enough to be able to dislodge the food in the esophagus to open the esophagus up and provide relief to the patient.

Referring now to FIG. 4A through FIG. 4F is an example of a process of using the presently disclosed EFBD device 100 for dislodging food from the esophagus. For example, FIG. 4A through FIG. 4F show a process of using EFBD device 100 to dislodge certain articles of food 210 from an esophagus 200.

First, EFBD device 100 is provided in the undeployed state. In this state, inflation member 120 is not inflated and may be wrapped or folded around esophageal catheter 110. Likewise, cone member 122 may be wrapped or folded around esophageal catheter 110.

In FIG. 4A, a user advances the undeployed EFBD device 100 into esophagus 200 such that at least distal guidance member 114 and possibly boring member 124 begins to push through and/or around the articles of food 210 lodged in esophagus 200.

In FIG. 4B, the user begins to inflate inflation member 120 and perhaps continues to advance EFBD device 100 into esophagus 200 such that at least a partially deployed inflation member 120 and/or cone member 122 begin to interact with the articles of food 210 lodged in esophagus 200. Boring member 124 is sufficiently short enough and of sufficiently low caliber relative to the partially or fully deployed inflation member 120 to avoid its contact with the esophageal luminal wall and still core the food bolus.

In FIG. 4C, the user fully inflates or deploys inflation member 120 and perhaps continues to advance EFBD device 100 into esophagus 200 such that a fully deployed inflation member 120 and/or cone member 122 begin to interact with the articles of food 210 lodged in esophagus 200. For example, the fully deployed inflation member 120 (along with boring member 124) begins to dislodge and push food 210 downward and/or sideways.

In FIG. 4D, the user continues to advance the fully deployed EFBD device 100 into esophagus 200. In so doing, the fully deployed inflation member 120 (along with boring member 124) continue to dislodge and push food 210 downward and/or sideways. Further, the fully deployed cone member 122 (i.e., open umbrella style) may engage in a sweeping action against the esophageal luminal walls and capture and push down any articles of food 210 that may be not yet cleared out by inflation member 120 and/or boring member 124.

In FIG. 4E, once substantially all articles of food 210 are dislodged from esophagus 200 and released into the patient's stomach, the user begins withdraw or retract the fully deployed EFBD device 100 from esophagus 200. In the process of withdrawing or retracting EFBD device 100 from esophagus 200, the user may allow inflation member 120 of EFBD device 100 to deflate to a relaxed state, as shown in FIG. 4F.

Referring now to FIG. 5 is a flow diagram of an example of a method 300 of using the presently disclosed EFBD device 100 for dislodging food from the esophagus. Generally, EFBD device 100 and method 300 may be used to press the food bolus against the esophageal luminal wall, dilating the esophagus stricture/stenosis if present and pushing the food from the esophagus into the stomach like a plunger. Method 300 may include, but is not limited to, the following steps.

At a step 310, the presently disclosed EFBD device 100 for dislodging food from the esophagus is provided. For example, the EFBD device 100 as described hereinabove with reference to FIG. 1 through FIG. 4F is provided. Proximal end 112 of esophageal catheter 110 of EFBD device 100 may be coupled to an endoscope (not shown).

At a step 315, EFBD device 100 in an uninflated state is introduced into the esophagus until engaged with food articles to be dislodged. For example, EFBD device 100 in an uninflated or undeployed state is introduced into esophagus 200 until engaged with articles of food 210 to be dislodged, as shown in FIG. 4A.

At a step 320, inflation member 120 of EFBD device 100 is inflated or deployed and in so doing cone member 122 is also deployed, as shown and described in FIG. 4B and FIG. 4C. For example, inflation member 120 of EFBD device 100 may be inflated with a predetermined volume of sterile solution (e.g., sterile water).

At a step 325, EFBD device 100 continues to be advanced into the esophagus until food articles are dislodged from esophagus, as shown and described in FIG. 4B, FIG. 4C, and FIG. 4D. In this step, the inflated or deployed inflation member 120 and/or cone member 122 of EFBD device 100 is used to push or compress the food lodged in the esophagus to the sides of the esophagus and allow the food in the lumen to be minimized enough to be dislodged and be pushed to the stomach. In this step, EFBD device 100 may be used to remove the impaction of the food and open the esophagus using a back and forth, insertion and withdrawal motion of esophageal catheter 110 and the endoscope (not shown).

At a step 330, inflation member 120 of EFBD device 100 is deflated and in so doing cone member 122 is also collapsed, as shown and described in FIG. 4F.

At a step 335, EFBD device 100 is withdrawn from the esophagus, as shown and described in FIG. 4E and FIG. 4F.

In summary and referring now again to FIG. 1 through FIG. 5, in some embodiments, the presently disclosed EFBD device 100 and method 300 may include esophageal catheter 110 that has distal guidance member 114, and also cone member 122, inflation member 120, and boring member 124 arranged along the esophageal catheter 110 in advance of distal guidance member 114.

Further, EFBD device 100 and method 300 provide cone member 122, inflation member 120, and boring member 124 arranged along esophageal catheter 110 and wherein cone member 122 is arranged at the proximal end of inflation member 120 and boring member 124 is arranged at the distal end of inflation member 120.

Further, EFBD device 100 and method 300 provide inflation member 120 that when deployed or inflated causes cone member 122 to deploy or open (i.e., open umbrella style) and wherein the diameter of the deployed cone member 122 is greater than the diameter of the deployed inflation member 120.

Further, EFBD device 100 and method 300 provide boring member 124 that has a blunt distal end suitable for pushing against food articles that may be lodged in the esophagus in advance of inflation member 120.

Further, EFBD device 100 and method 300 provide cone member 122 that when deployed or open (i.e., open umbrella style) may engage in a sweeping action against the esophageal luminal walls and capture and push down any articles of food that may be not yet cleared out by inflation member 120 and/or boring member 124.

Further, EFBD device 100 and method 300 provide cone member 122, inflation member 120, and boring member 124 arranged along esophageal catheter 110 and wherein the combination of cone member 122 in the partially or fully deployed state, inflation member 120 in the partially or fully deployed state, and boring member 124 may be used to dislodge food in a procedure for endoscopic removal of food bolus.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. An esophageal food bolus dislodge device consisting of: an esophageal catheter consisting of a proximal end and a distal end; a balloon consisting of a proximal end and a distal end, wherein the balloon is in fluid communication with the esophageal catheter; a cone positioned at the proximal end of the balloon; and a hollow tapered structure positioned at the distal end of the balloon, wherein the hollow tapered structure has a blunt distal end, and wherein the cone and the balloon, and the hollow tapered structure are arranged along the esophageal catheter proximal the distal end, and wherein the cone and the proximal end of the balloon are secured to the esophageal catheter at a proximal anchor region and the hollow tapered structure and-the distal end of the balloon are secured to the esophageal catheter at a distal anchor region;

wherein the balloon and the cone each has a non-deployed or uninflated state and a deployed or inflated state;

wherein the cone in the deployed or inflated state has a diameter greater than a diameter of the balloon in the deployed or inflated state; and wherein the cone has a structure selected from the group consisting of a plunger-like structure and an umbrella-like structure.

2. The esophageal food bolus dislodge device of claim 1, wherein the balloon is an esophageal balloon.

3. The esophageal food bolus dislodge device of claim 1, wherein the balloon consists of an elastomer material.

4. The esophageal food bolus dislodge device of claim 1, wherein the cone consists of a flexible elastomer material.

5. The esophageal food bolus dislodge device of claim 1, wherein the distal end consists of silicone rubber.

6. A method for dislodging one or more food articles from an esophagus of a subject in need thereof, the method comprising:

(a) providing an esophageal food bolus dislodge device of claim 1;

(b) introducing the esophageal food bolus dislodge device in a non-deployed or uninflated state into the esophagus of the subject until the device is engaged with the one or more food articles to be dislodged;

(c) deploying or inflating the balloon, thereby deploying the cone;

(d) advancing the esophageal food bolus dislodge device further into the esophagus until the one or more food articles are dislodged; and (e) deflating the balloon such that the balloon and the cone are in a non-deployed or uninflated state; and (f) withdrawing the esophageal food bolus dislodge device from the esophagus.

7. The method of claim 6, further comprising moving the esophageal food bolus dislodge device in a back and forth motion to dislodge the one or more food articles.

8. The method of claim 6, further comprising coupling the proximal end of the esophageal catheter of the esophageal food bolus dislodge device to an endoscope.

\* \* \* \* \*